United States Patent [19]
Drexel et al.

[11] Patent Number: 5,261,329
[45] Date of Patent: Nov. 16, 1993

[54] DEVICE FOR TRANSPORTING WORKPIECES

[75] Inventors: Peter Drexel, Steinenbronn; Hans Erne; Rainer Utz, both of Waiblingen; Christian Sauer, Winterbach; Thomas Schmid, Ludwigsburg; Stefan Reitmeier, Waiblingen-Hohenacker, all of Fed. Rep. of Germany

[73] Assignee: Robert Bosch GmbH, Stuttgart, Fed. Rep. of Germany

[21] Appl. No.: 777,545

[22] PCT Filed: Apr. 5, 1991

[86] PCT No.: PCT/DE91/00286
 § 371 Date: Dec. 12, 1991
 § 102(e) Date: Dec. 12, 1991

[87] PCT Pub. No.: WO91/17018
 PCT Pub. Date: Nov. 14, 1991

[30] Foreign Application Priority Data
 May 8, 1990 [DE] Fed. Rep. of Germany ....... 4014698

[51] Int. Cl.$^5$ .............................................. B23Q 7/14
[52] U.S. Cl. ................................... 104/295; 104/245; 104/296

[58] Field of Search ............... 104/242, 245, 287, 288, 104/295, 296, 48, 50; 180/131

[56] References Cited

U.S. PATENT DOCUMENTS

| 4,275,660 | 6/1981 | Forster | 104/242 |
| 4,802,622 | 2/1989 | Homan | 104/245 |
| 4,920,893 | 5/1990 | Maupu | 104/242 |
| 5,044,283 | 9/1991 | Marie et al. | 104/48 |

FOREIGN PATENT DOCUMENTS

0104118 8/1979 Japan ................................. 104/245

Primary Examiner—Mark T. Le
Attorney, Agent, or Firm—Michael J. Striker

[57] ABSTRACT

A device for transporting workpieces comprises a transporting path carrier, a plurality of transporting wagons adapted to run on the transporting path carrier, units at every transporting wagon for blocking its traveling when the transporting wagon is located outside a predetermined transporting path, inquiring unit adapted to inquire the transporting path and control the blocking units, and at least one wall surface provided in the transporting path so as to be inquired by the sensor, the at least one wall surface being arranged next to the running surface and at an angle relative to the running surface on the transporting path carrier.

9 Claims, 2 Drawing Sheets

DEVICE FOR TRANSPORTING WORKPIECES

BACKGROUND OF THE INVENTION

The present invention relates to a device for transporting workpieces. More particularly it relates to a device for transporting workpieces with a transporting path system for transporting wagons, wherein the transporting wagons have their own traveling mechanisms, and means is provided for controlling the travelling mechanisms and possibly the traveling paths of the transporting wagons. In a known device of this generic type the sensors provided for monitoring the system conformity are directed toward the running surface of the transporting path carrier and, via control means which are arranged downstream, render the blocking of the traveling mechanism ineffective as soon as and as long as they determine the presence of the running surface and a predetermined vertical distance relative to the latter. However, this arrangement is not completely assured because the sensors also cancel the blocking of the traveling mechanism when the transporting wagon is located outside the transporting path on a surface which corresponds to the running surface of the transporting path carrier with respect to material and surface characteristics.

SUMMARY OF THE INVENTION

Accordingly, it is an object of the present invention to provide a device for transporting workpieces which avoids the disadvantages of the prior art.

In keeping with these objects and with others which will become apparent hereinafter, one feature of the present invention resides, briefly stated, in a device for transporting workpieces of the above mentioned general type in which at least one wall surface of the transporting path inquired about by sensor of locking means is provided next a running surface and at an angle relative to the latter at a transporting path carrier.

When the device for transporting workpieces is designed in accordance with the present invention it has the advantage over the prior art that an incorrect diagnosis on the part of the sensors at the transporting cars determining the system conformity is virtually excluded because the sensors actually cancel the blocking of the traveling mechanism only when the transporting wagon is located at a location which conforms to the system and has the characteristics features of the transporting path. The arrangement according to the invention also prevents improper use of the transporting car.

Further advantageous embodiments of the present invention are specified hereinabove.

A simple arrangement results when the wall surface of the transporting path sought by the sensors of the blocking means is formed directly by a supporting surface at the transporting path carrier serving for the lateral guidance of the transporting car.

In this arrangement it is sufficient in itself to provide a single sensor which inquires about the presence of one supporting surface. In a preferred embodiment form, however, at least two sensors are provided at every transporting car, which sensors inquire about two opposite supporting surfaces of the transporting path carrier or carriers. In this case, protection against improper use of the transporting wagons is further increased and the proper condition of the transporting path is also checked to a certain extent.

Inquiring about both supporting surfaces has the further advantage that the desired protective function is also maintained when the operational flow provides for travel of the transporting wagon in both directions and for a turning of the transporting wagons by 180° when the traveling direction is changed (forward travel of the transporting wagons in both traveling directions). In this case it is suggested in a further development of the invention that a free track which is located opposite in a mirror-inverted manner with respect to the longitudinal center plane of symmetry of the transporting path is assigned to at least a part of the function elements at the transporting path carrier which cooperate with function elements at the transporting wagon. Accordingly only the function elements assigned to this traveling direction are effective in every traveling direction of the transporting wagons.

In transporting path systems having curve segments and/or switches with curved branches advantageous constructive solutions result When at least two sensors are provided at every transporting wagon which sensor inquire about two opposite supporting surfaces of the transporting path carrier or carriers.

In transporting path systems constructed in this way, the quantity of sensors to be provided at the transporting wagons can be reduced when at least one sensor is arranged and constructed in such a way that it detects at least two wall surfaces which are at different distances from its movement path and forms different signals from this.

The protection of the system can be increased without considerable extra expense when the sensor arrangement of the blocking means also monitors the movement path of the transporting wagons and possibly the surrounding area and causes a blocking of the traveling mechanism in the event of unintended obstacles or damage to the transporting path carrier.

The novel features which are considered as characteristics for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
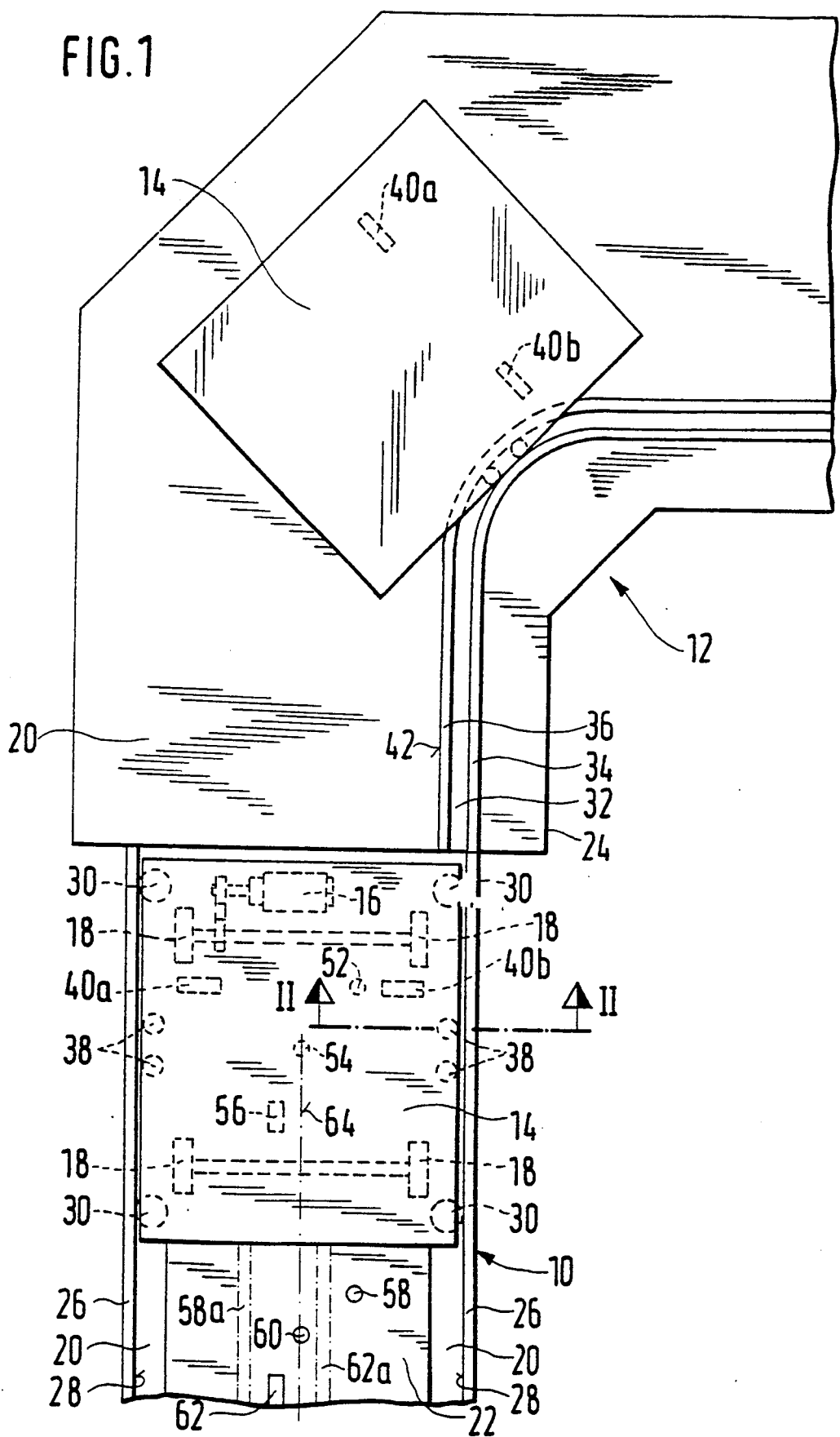
FIG. 1 shows a top view of a portion of the transporting path system according to the first embodiment example.

The transporting path system according to FIG. 1 has a transporting path for transporting wagons 14 with straight-line segments 10 and curve segments 12, the transporting wagons 14 being provided with their own traveling mechanism 16. This traveling mechanism can preferably be supplied by a battery carried along by it and/or from feed lines integrated into the transporting path. Every transporting wagon 14 has four running wheels 18 which rest on running surfaces 20 of transporting path carriers 22, 24 of the individual transporting path portions. The traveling mechanism 16 can act on a set of running wheels or also on both sets of running wheels, as is shown.

Both longitudinal edges of the extend transporting path carrier 22 are provided with a skirt 26, and the supporting surfaces 28 are formed at the inner sides of the latter. Every transporting wagon 14 is laterally guided at the supporting surfaces 28 by four supporting rollers 30 which are rotatably supported at it. A guide groove 32 whose flanks are formed at strip-like projections 34, 36 of the transporting path carrier 24 which are at the same vertical height are provided for the lateral guidance of the transporting wagons 14 in the curve portion 12. The transporting wagons 14 are provided with two rotatably supported guide rollers 38 at each edge side extending parallel to the travel direction. The guide rollers 38 engage with slight play in the guide groove 32 in the curve segment 12 and force the turning of the transporting wagon. Further, means, not shown in the drawing, for slightly lifting the running wheels 18 of the transporting wagons 14 from the running surface 20 and thus ensuring a turning of the transporting wagons 14 without causing wear are provided at the transporting wagons 14 and the curve segments 12.

Two sensors 40a and 40b of a protective device are provided at every transporting wagon 14. The protective device blocks the traveling mechanism 16 of the transporting wagon 14 when the sensors 40a, b detect the absence of wall surfaces conforming to the system, according to the invention. The wall surfaces are formed in the area of the straight-line segments 10 by the supporting surfaces 28 at the skirts 26 and in the curve portions 12 by the wall surface 42 provided at the strip-shaped projection 36 and facing away from the center of curvature.

The sensors 40a, b are arranged and constructed in such a way that they detect the wall surfaces 28 and 42 which are located at different distances from the sensors and form-signals from this. Further, the sensors 40a, b form a third signal when none of the scanned wall surfaces 28, 42 are present. The logic arranged downstream is constructed in such a way that it processes the signals of the sensors 40a, b with a delay, specifically in such a way that it only cancels the blocking of the traveling mechanism 16 when either both, sensors 40a, determine the presence of wall surface 28 or one sensor determines the presence of wall surface 42. Every other signal indication leads to a delayed blocking of the traveling mechanism 16. This ensures that the traveling mechanism 16 can actually be effective only when the transporting wagon 14 is located on the travel path belonging to the system.

Additional function elements 52, 54, 56 which cooperate with function elements 58, 60, 62 at the transporting path carriers 22, 24 are provided at the underside of the transporting wagons 14 for controlling the traveling mechanisms 16 and, if necessary, the traveling paths according to a predetermined program. The arrangement is effected in such a way that a free track 58a, 62a is located opposite the function elements 58, 62 at the transporting path carriers 22, 24 in a mirror-inverted manner with reference to their longitudinal center plane 64. This enables an operation in which the transporting wagons 14 run in forward travel respectively in both directions and only the function elements assigned to the respective traveling direction are effective. The two function elements 54 and 60 lying in the longitudinal center plane either execute the same function in both traveling directions or are constructed in such a way that they act as a function of the traveling direction.

Figure 2:
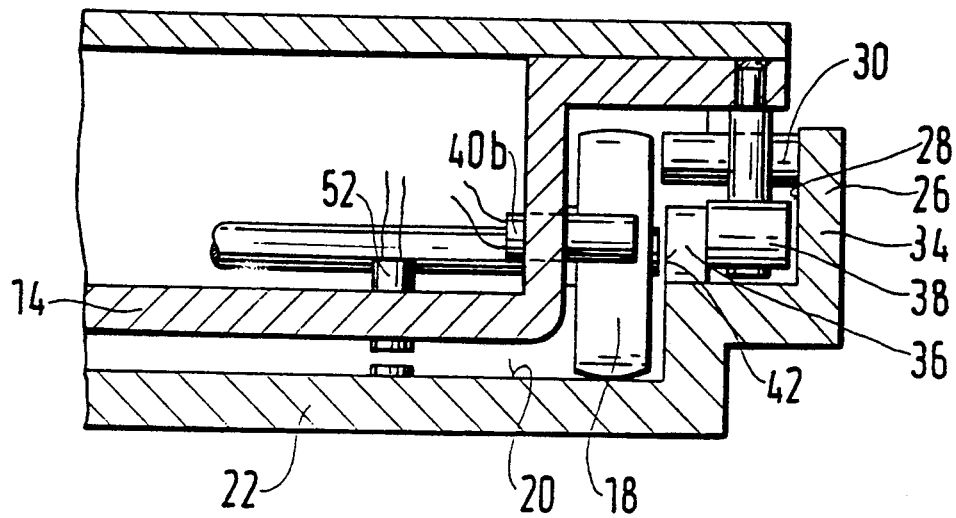
FIG. 2 shows a section according to line II—II in FIG. 1 in an enlarged view.
Figure 3:
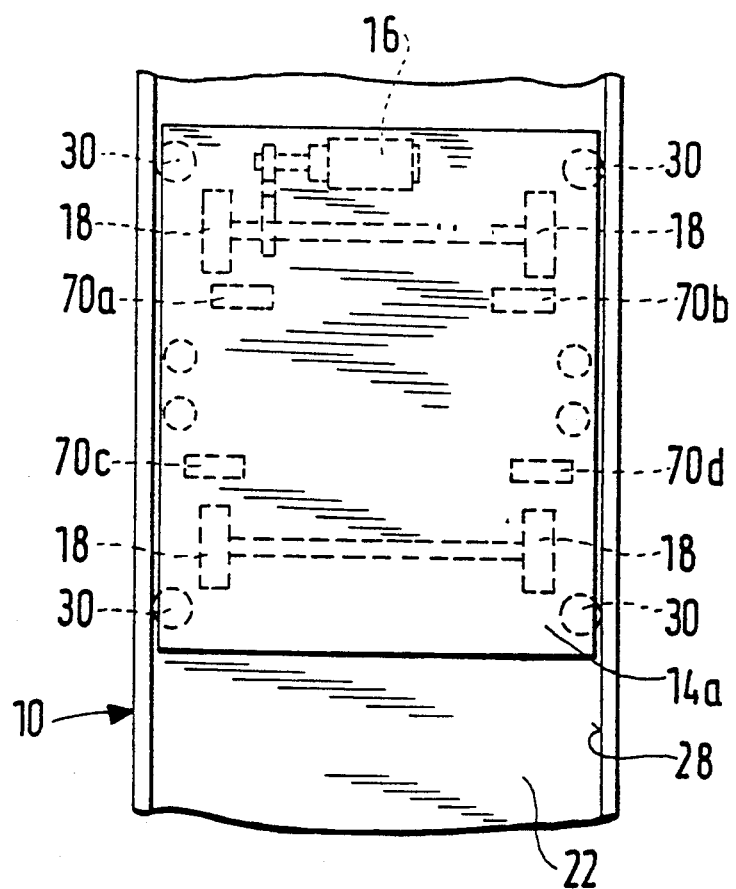
FIG. 3 shows a top view of a transporting path portion and a transporting wagon of the second embodiment example.

The embodiment example according to FIG. 3 differs from the embodiment example according to FIGS. 1 and 2 in that four sensors 70a, b, c, d are provided at every transporting wagon 14a for monitoring the system conformity. The sensors 70a, b are arranged at the same location as the sensors 40a, b of the first embodiment example, but are constructed in such a way that they detect only the presence or absence of the wall surfaces 42 (FIG. 2) provided in the curve segments 12. The two other sensors 70c, d are arranged and constructed in such a way that they detect only the presence or absence of the supporting surfaces 28 provided in the straight-line segments 10. For this purpose the sensors 70c, d are arranged at a vertical distance over the running surface 20 of the transporting path carriers 22, 24 such that they overlap the strip-like projections 36 of the transporting path carriers 24 in the curve segments 12.

The logic arranged downstream is again constructed in such a way that it processes the signals of the sensors 70a, b, c, d with a delay. The traveling mechanism 16 is released only when either the two sensors 70c, d signal the presence of the supporting surfaces 28 or when one of the sensors 70a, b determines the presence of a wall surface 42. The traveling mechanism 16 is blocked for all other signal indications, so that improper use of the transporting wagons 14a is likewise prevented and the transporting the wagon cannot be moved when it is located outside the transporting path.

Blocking means on every transporting means is identified as 80 and can block its traveling, for example when the transporting wagon is located outside a predetermined transporting path, etc.

It will be understood that each of the elements described above, or two or more together, may also find a useful application in other types of constructions differing from the type described above.

While the invention has been illustrated and described as embodied in a device for transporting workpieces, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for transporting workpieces, comprising a transporting path carrier having a running surface; a plurality of transporting wagons adapted to run on said transporting path carrier; means at every transporting wagon for blocking its traveling when said transporting wagon is located outside a predetermined transporting path; inquiring means adapted to inquire the transporting path and control said blocking means; and at least one wall surface provided in said transporting path so as to be inquired by said inquiring means so that when said inquiring means determine the absence of said wall surface said inquiring means control said blocking means so that said blocking means block the traveling of the transporting wagon, said at least one wall surface being arranged next to said running surface and at an angle relative to said running surface on said transporting path carrier.

2. A device as defined in claim 1, wherein each of said transporting wagons has a traveling mechanism, said blocking means being connected with said traveling mechanism so as to block the latter.

3. A device as defined in claim 1, wherein said wall surface inquired about by said inquiring means is formed as a supporting surface on said transporting path carrier so as to provide simultaneously a lateral guidance of said transporting wagons.

4. A device as defined in claim 1, wherein each of said transporting wagons includes two sensors; and further comprising a second wall surface provided next to said running surface and at an angle relative to the latter on said transporting path carrier, each of said sensors inquiring a respective one of said wall surfaces.

5. A device as defined in claim 4, wherein said two wall surfaces are formed as two opposite supporting surfaces of said transporting path carrier.

6. A device as defined in claim 1, wherein said inquiring means includes a sensor, said transporting path carrier having a straight line segment and a curved segment provided with a guide groove for guiding said transporting wagons, said wall surface having a surface located next to said guide groove and having a curvature which corresponds to said curved segment, said wall surface forming a supporting surface at least in the region of said straight line segment, said sensor being arranged so as to inquire about said supporting surface in the region of said straight line segment and to inquire about said wall surface in the region of said curved segment.

7. A device as defined in claim 6, wherein said wall surface is arranged vertically relative to said running surface.

8. A device as defined in claim 6, wherein said transporting path carrier is provided with a strip-shape projection in the region of said curved segment and projects upward from said running surface, one longitudinal side of said projection forming a flank of said guide groove and another longitudinal side being defined by said wall surface inquired about by said sensor.

9. A device as defined in claim 1; and further comprising another lateral wall surface, said wall surfaces being arranged at different distances from a longitudinal center line of said predetermined transporting path, said inquiring means including two sensors detecting said wall surfaces and forming signals from said detecting.

* * * * *